(12) United States Patent
Durocher et al.

(10) Patent No.: US 12,503,243 B2
(45) Date of Patent: Dec. 23, 2025

(54) METHOD AND SYSTEM FOR OPERATING A HYBRID AIRCRAFT ENGINE

(71) Applicant: PRATT & WHITNEY CANADA CORP., Longueuil (CA)

(72) Inventors: Eric S. Durocher, Boucherville (CA); Michel Abdelnour, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 120 days.

(21) Appl. No.: 18/633,735

(22) Filed: Apr. 12, 2024

(65) Prior Publication Data

US 2025/0319980 A1   Oct. 16, 2025

(51) Int. Cl.
*B64D 31/18* (2024.01)
*B64C 11/30* (2006.01)

(52) U.S. Cl.
CPC ............ *B64D 31/18* (2024.01); *B64C 11/305* (2013.01)

(58) Field of Classification Search
CPC .............................. B64D 31/18; B64C 11/305
See application file for complete search history.

(56) References Cited

U.S. PATENT DOCUMENTS

| | | | |
|---|---|---|---|
| 5,345,154 A | 9/1994 | King | |
| 10,040,566 B2 * | 8/2018 | Waltner | B60L 50/16 |
| 10,125,692 B2 | 11/2018 | Ernst | |
| 10,378,452 B1 | 8/2019 | Barmichev et al. | |
| 11,186,378 B2 | 11/2021 | Dubreuil et al. | |
| 11,479,348 B2 | 10/2022 | Gons | |
| 11,539,316 B2 * | 12/2022 | Gemin | H02P 9/008 |
| 11,846,198 B2 | 12/2023 | Vive et al. | |
| 2016/0052626 A1 * | 2/2016 | Vander Mey | B64C 27/20 244/6 |
| 2018/0354631 A1 * | 12/2018 | Adibhatla | B64D 27/35 |
| 2018/0370646 A1 * | 12/2018 | Hon | F02C 7/32 |
| 2019/0092453 A1 * | 3/2019 | Hoemke | B64C 11/385 |
| 2019/0264617 A1 | 8/2019 | Barmichev et al. | |
| 2019/0322382 A1 | 10/2019 | Mackin | |
| 2020/0031480 A1 * | 1/2020 | Baig | B60L 58/20 |
| 2020/0083791 A1 * | 3/2020 | Latulipe | H02P 27/06 |
| 2020/0298988 A1 * | 9/2020 | LaTulipe | B64D 35/023 |
| 2020/0347743 A1 * | 11/2020 | Long | B64D 27/33 |

(Continued)

FOREIGN PATENT DOCUMENTS

EP   4328139 A1   2/2024

*Primary Examiner* — Mussa A Shaawat
(74) *Attorney, Agent, or Firm* — Norton rose fulbright Canada LLP

(57) ABSTRACT

The method can include operating the hybrid aircraft power plant in a first mode of operation in which a plurality of controllable parameters including a fuel flow to the thermal engine and an electric power to the electric motor has a first set of values corresponding to a first power output; receiving a requested power output; determining a second set of values of the one or more of the controllable parameters to bring first power output to the requested power output; determining whether said second set of values poses a risk of undesired clutch behavior; and when the second set of values poses the risk, modulating the second set of values to avoid the risk and setting the plurality of controllable parameters to the modulated second set of values.

20 Claims, 7 Drawing Sheets

(56) References Cited

U.S. PATENT DOCUMENTS

| | | | | |
|---|---|---|---|---|
| 2021/0094694 | A1* | 4/2021 | Seminel | B64D 27/34 |
| 2021/0101691 | A1* | 4/2021 | Mark | B64D 27/33 |
| 2021/0388733 | A1* | 12/2021 | Valois | F01D 15/12 |
| 2022/0009615 | A1* | 1/2022 | Mark | B64C 11/303 |
| 2022/0065177 | A1* | 3/2022 | McQuiston | F01D 15/10 |
| 2022/0306307 | A1* | 9/2022 | Tsutsumi | B64D 27/357 |
| 2022/0380030 | A1* | 12/2022 | Piccone | B64D 27/33 |
| 2023/0047326 | A1* | 2/2023 | Freer | F01D 15/10 |
| 2023/0078649 | A1* | 3/2023 | Hettenkofer | B64D 27/10 |
| | | | | 244/60 |
| 2023/0234715 | A1* | 7/2023 | Hickey | H02K 7/1823 |
| | | | | 244/53 R |
| 2023/0323788 | A1* | 10/2023 | Vive | F02C 7/32 |
| | | | | 415/122.1 |
| 2024/0069527 | A1* | 2/2024 | Long | B64D 13/006 |
| 2024/0270399 | A1* | 8/2024 | Currier | B64D 31/04 |
| 2024/0300662 | A1* | 9/2024 | Kumar | B64D 35/025 |
| 2024/0359801 | A1* | 10/2024 | Anderson | B64D 31/18 |
| 2024/0367807 | A1* | 11/2024 | Freer | B64D 31/18 |
| 2025/0206449 | A1* | 6/2025 | Bertrand | F02C 6/10 |
| 2025/0223049 | A1* | 7/2025 | Gazzino | B64D 27/33 |
| 2025/0244203 | A1* | 7/2025 | Lu | B64D 35/022 |
| 2025/0250015 | A1* | 8/2025 | Durocher | B64C 11/30 |

\* cited by examiner

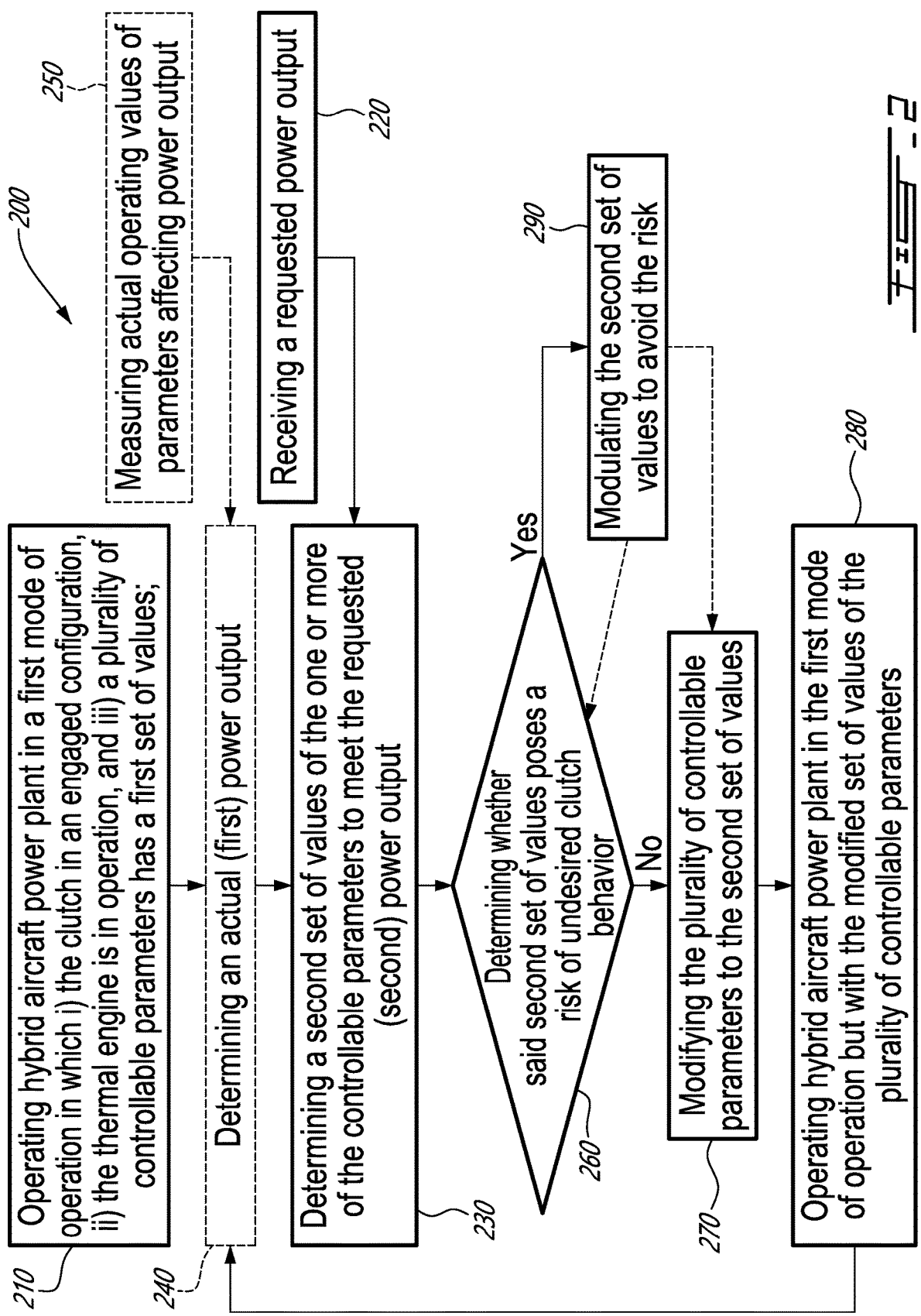

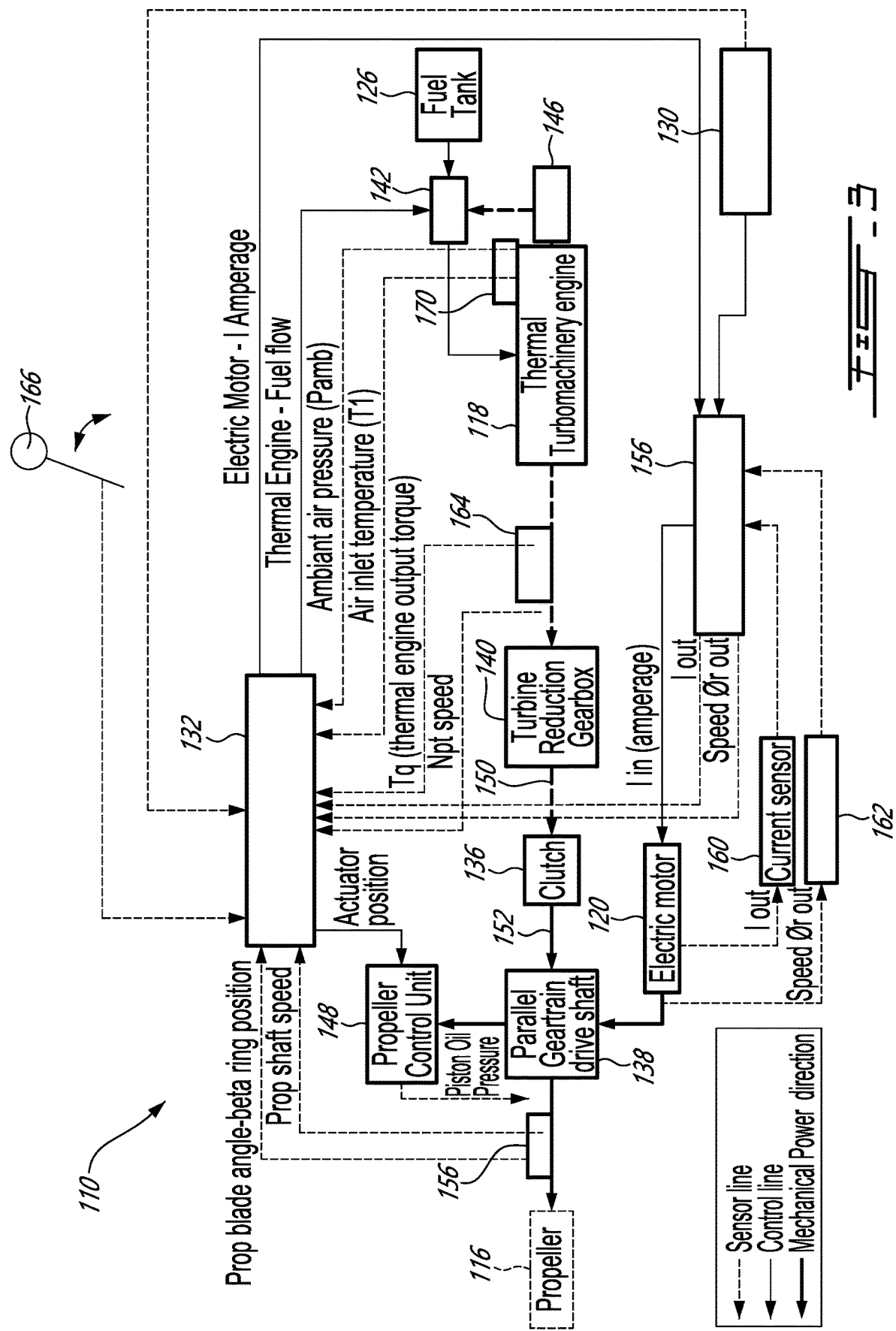

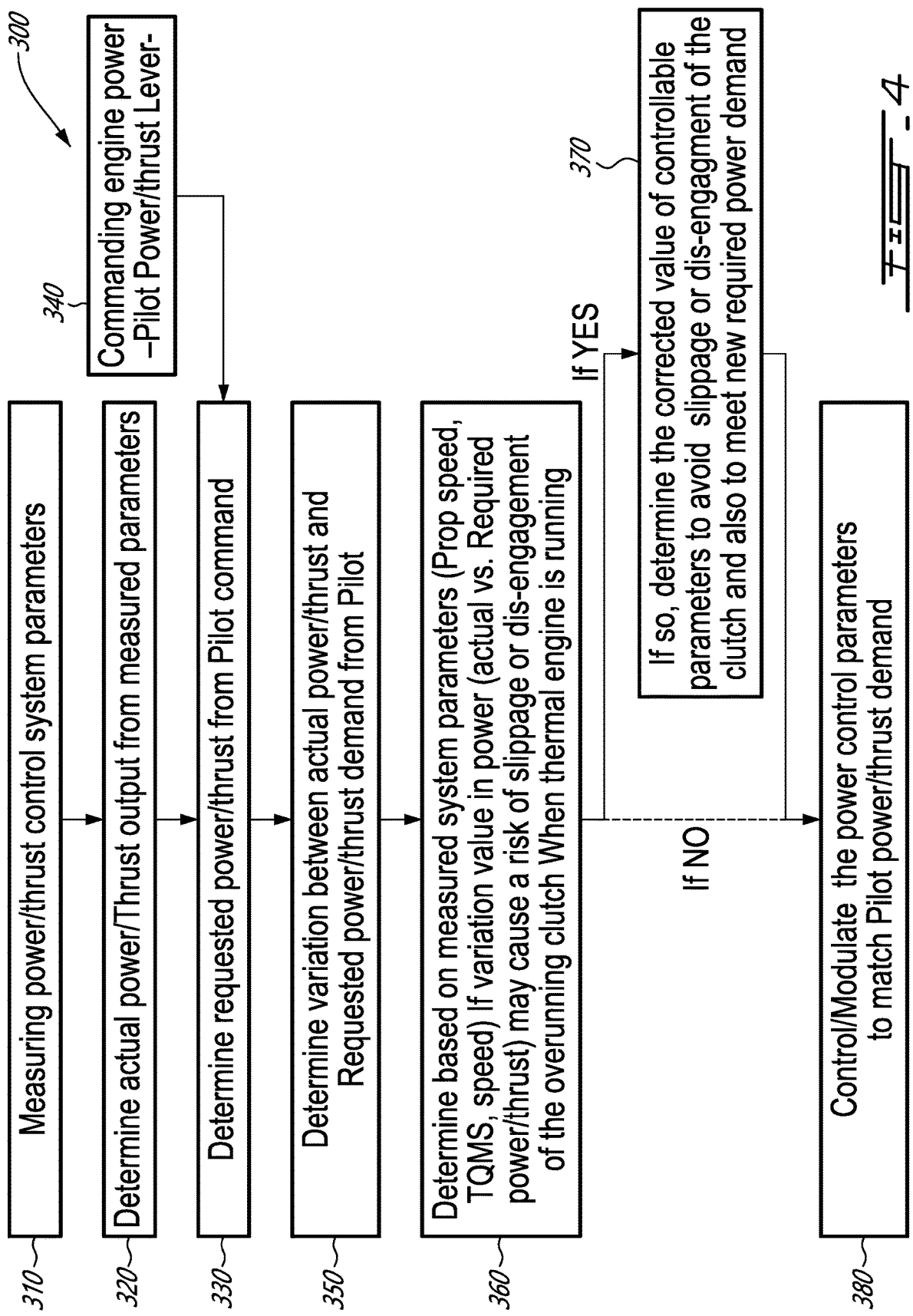

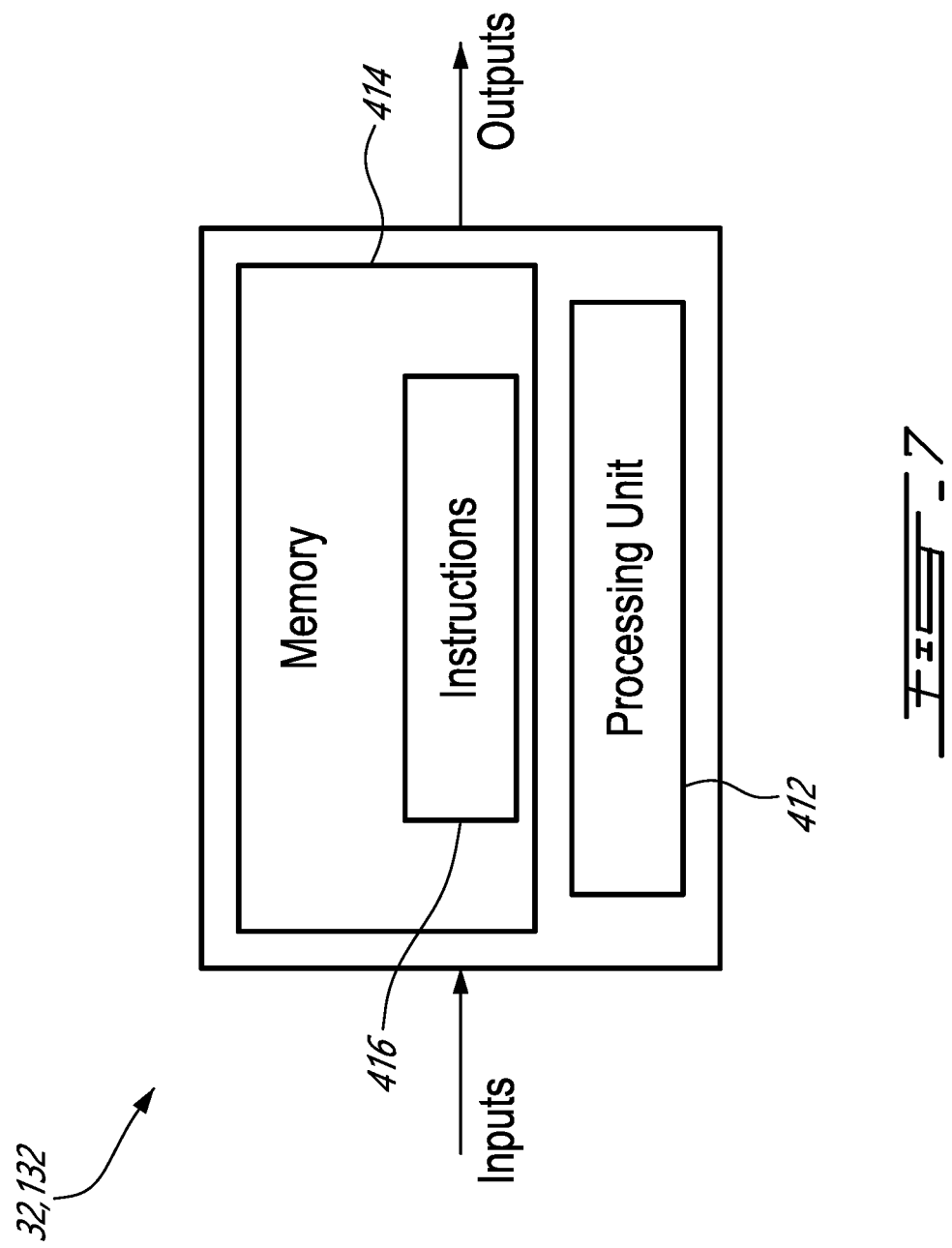

METHOD AND SYSTEM FOR OPERATING A HYBRID AIRCRAFT ENGINE

TECHNICAL FIELD

The application relates generally to hybrid aircraft power plants and, more particularly, to architectures thereof.

BACKGROUND OF THE ART

Hybrid aircraft power plants that include a thermal engine and an electric motor for propelling aircraft can provide operational advantages. However, there are several challenges along the path to fully harnessing this potential. For instance, hybrid aircraft power plants may benefit from having means to allow either one, or both, of the electric motor or the thermal engine to operate independently from the other in some operation modes, and simultaneously in other modes of operation. While there may be different ways of satisfying such needs, power plant design factors in various considerations, such as limiting production cost and maintenance costs, which may benefit from a design having a lower number of different parts. Moreover, in the case of aircraft applications, there is a concern for increased reliability and weight reduction than in ground-based applications. Such considerations complexify the puzzle of optimizing hybrid power plant architecture for the designers.

SUMMARY

In one aspect, there is provided a method of operating a hybrid aircraft power plant having a propeller, a propeller control unit operable to change a pitch of blades of the propeller, an electric motor coupled to the propeller, a thermal engine, a first shaft coupling the thermal engine to an overrunning clutch, and a second shaft coupling the overrunning clutch to the propeller, the method comprising: operating the hybrid aircraft power plant in a first mode of operation in which i) the overrunning clutch is in an engaged configuration, ii) the thermal engine is in operation, and iii) a plurality of controllable parameters including the pitch of the blades, a fuel flow to the thermal engine, and an electric power to the electric motor, have a first set of values associated to a first power output; receiving a requested power output; determining a second set of values of the one or more of the controllable parameters to bring the first power output to the requested power output; determining whether said second set of values poses a risk of undesired clutch behavior; when the second set of values does not pose the risk, setting the plurality of controllable parameters to the second set of values; and when the second set of values poses the risk, modulating the second set of values to avoid the risk and setting the plurality of controllable parameters to the modulated second set of values.

In another aspect, there is provided a method of operating a hybrid aircraft engine having an electric motor coupled to a load, a thermal engine coupled to a load, an overrunning clutch coupled to one of the thermal engine and electric motor via a first shaft, the overrunning clutch coupled to the load via a second shaft, the method comprising: operating the hybrid aircraft engine in a first mode of operation in which a plurality of controllable parameters including a fuel flow to the thermal engine and an electric power to the electric motor has a first set of values corresponding to a first power output; receiving a requested power output; determining a second set of values of the one or more of the controllable parameters to bring first power output to the requested power output; determining whether said second set of values poses a risk of undesired clutch behavior; when the second set of values does not pose the risk, setting the plurality of controllable parameters to the second set of values; and when the second set of values poses the risk, modulating the second set of values to avoid the risk and setting the plurality of controllable parameters to the modulated second set of values.

In a further aspect, there is provided a method of operating a hybrid aircraft engine comprising: operating the hybrid aircraft power plant in a first mode of operation in which a plurality of controllable parameters including a fuel flow to the thermal engine and an electric power to the electric motor has a first set of values corresponding to a first power output; receiving a requested power output; determining a second set of values of the one or more of the controllable parameters to bring first power output to the requested power output; determining whether said second set of values poses a risk of undesired clutch behavior; and when the second set of values poses the risk, modulating the second set of values to avoid the risk and setting the plurality of controllable parameters to the modulated second set of values.

DESCRIPTION OF THE DRAWINGS

Reference is now made to the accompanying figures in which:

FIG. 2 is a flow chart of a method of operating a hybrid aircraft power plant;

FIG. 3 is a schematic view of a hybrid aircraft power plant;

FIG. 4 is a flow chart of a method of operating a hybrid aircraft power plant;

FIG. 7 is a schematic view of a computer.

DETAILED DESCRIPTION

In this specification, the term "connected" may include both direct connection (in which two elements that are connected to each other contact each other) and indirect connection (in which at least one additional element is located between the two elements) unless the expression "direct" is specifically used to identify a direct connection. Similarly, the terms "coupled" and "engaged" may include both direct coupling or engagement (in which two elements that are coupled to each other contact each other) and indirect connection (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Figure 1:
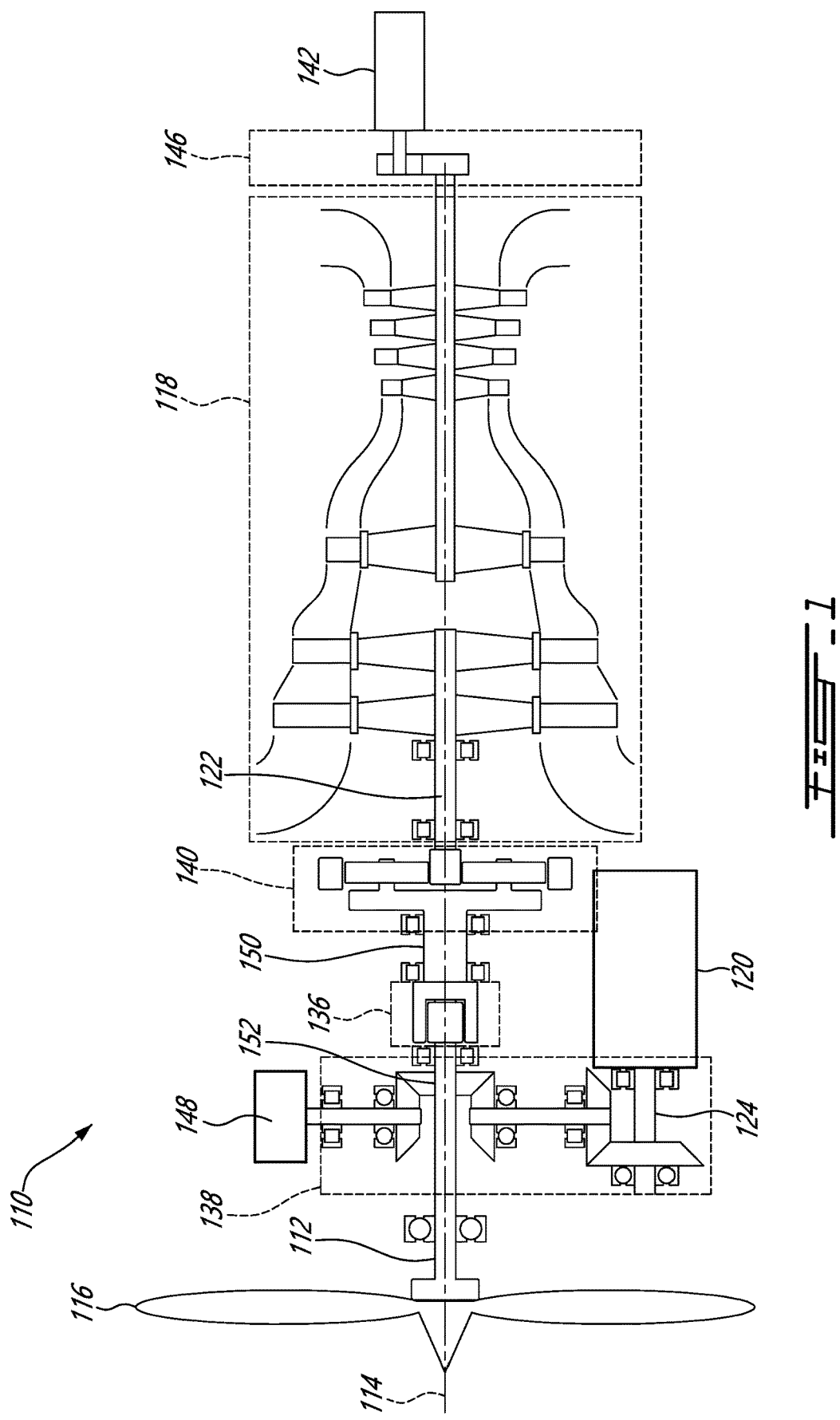
FIG. 1 is a schematic cross-sectional view of a hybrid aircraft power plant.

FIG. 1 is a schematic illustration of an exemplary configuration of power plant 110 being drivingly connected to propeller 116. The propeller 116 is non-limiting example of a suitable air mover or load. In this example, the power plant 110 is drivingly connected to propeller 116 via an output shaft 112. The output shaft 112 rotates about an axis 114. Propeller 116 may be a variable pitch propeller. Power plant 110 may include one or more thermal engines 118 (referred hereinafter in the singular) and one or more electric motors 120 (referred hereinafter in the singular). The power plant 110 can be referred to as an hybrid aircraft engine in this embodiment. In an embodiment of power plant 110, the thermal engine 118 is coupled to the output shaft 112 via a clutch 136, and the electric motor 120 may thus be selectively operable to drive the propeller 116 independently from the thermal engine 118. More specifically, in the example presented in FIG. 1, the thermal engine 118 has a thermal engine shaft 122, and the electric motor 120 has a rotor shaft 124.

More specifically, the clutch 136 can be in an engaged configuration, in which it mechanically couples the thermal engine 118 to the propeller 116, or in a disengaged configuration, which disengages the thermal engine 118 from the propeller 116. The switch from one configuration to the other may be automatic or passive, e.g., via using an overrunning clutch, or active, e.g., via the control of an actuator. When the thermal engine 118 is disengaged from the propeller 116, the thermal engine can be shut down/inoperative, and the propeller 116 may nonetheless be driven by the electric motor 120. The electric motor 120 may be coupled to the output shaft 112 via a geartrain 138. The thermal engine 118 may be coupled to a fuel management unit 142.

It will be noted in the specific embodiment illustrated, the thermal engine 118 is a gas turbine engine, the thermal engine shaft 122 is coupled to the clutch 136 via reduction gearing 140, and the thermal engine 118 is coupled to the fuel management unit 142 via an auxiliary gearbox 146. Reduction gearing is optional and may not be present, for instance, in an embodiment where the thermal engine is a piston or Wankel engine, or in an embodiment where the load is not a propeller. In this embodiment, the propeller 116 is a variable pitch propeller, and the power plant 110 further has a propeller control unit, PCU 148, operable to change the pitch of the blades of propeller 116. In this embodiment, the PCU 148 is coupled to the output shaft 112 by the gearing 138 and driven by the output shaft 112.

The power plant 110 may be selectively controlled to operate in either one of more than one mode of operation.

In a first mode of operation, the clutch 136 is in the engaged configuration, and the thermal engine 118 is operated to drive the propeller 116 via the clutch 136. In the first general mode of operation, three sub-modes of operation are possible. More specifically, the electric motor 120 may either be operated i) in motor mode to output power, e.g., collaborate with the thermal engine 118 in driving the propeller, ii) in generator mode to receive power from the thermal engine 118 or propeller 116 and convert it into electrical energy to be stored in a battery or used to supply electric power to aircraft electrical systems, or iii) in freewheel mode in which it neither generates power nor receives power. The motor mode may be useful at takeoff or climbing for instance. The generator mode may be useful during descent for instance. The freewheel mode may be useful when cruising for instance.

When the clutch 136 is a passive clutch, the first mode of operation may occur whenever the power or torque generated on output shaft 112, by the electric motor 120 and/or possibly propeller 116 in the case of windmilling, is less than the power or torque generated by the thermal engine 118, and the clutch 136 may switch from the engaged configuration to the disengaged configuration when the power or torque generated on the output shaft 112 is greater than the power or torque generated by the thermal engine 118.

In a second mode of operation, the clutch 136 is in the disengaged configuration and the thermal engine does not contribute to mechanically driving the output shaft 112 nor the gearing 138. The thermal engine 118 may be maintained in an inoperative state, e.g., not driven in rotation and not consuming any fuel. The electric motor 120 may be operated to drive the output shaft 112, and thus the propeller 116 (or other load), via the gearing 138.

The second mode of operation can be useful in situations where operation of the electric motor 120 only are desired, i.e., when operation of the thermal engine 118 is not required or desired. Such a situation may occur when taxiing an aircraft, to name one example. Indeed, there may be many benefits to operating the power plant 110 in the second mode of operation when taxiing the aircraft since taxiing is typically portion of the mission in which the power requirement at the output shaft 112 is relatively low, and where noise reduction may be beneficial (particularly when the airport is close to a residential area). Operation of the electric motor 120 may be significantly less noisy than operation of the thermal engine 118.

It was found that in an architecture using a passive clutch, such as an overrunning clutch 136, undesired clutch behavior may occur when certain conditions are met. Such conditions may imply the rotation speed of a first shaft 150 and of a second shaft 152. The first shaft 150 may connect the thermal engine 118 to the clutch 136, and may be an input shaft of the clutch 136. The second shaft 152 may connect the clutch 136 to the load (e.g., propeller 116), and may be an output shaft of the clutch 136. The first shaft 150 and the second shaft 152 can be directly connected to the clutch 136, such as forming part of the clutch 136 or otherwise being directly coupled to clutch 136.

A first example of undesired clutch behavior is undesired or unintended clutch disengagement. Such clutch disengagement occurs when the second shaft 152 has a greater rotation speed than the first shaft 150. This may occur when torque is greater in the second shaft 152 than in the first shaft 150. A second example of undesired clutch behavior is clutch slippage. Clutch slippage may occur when the second shaft 152 has a slightly greater rotation speed than the first shaft 150. Clutch slippage or clutch disengagement may be driven by corresponding relative torque conditions. For instance, clutch disengagement may occur when the torque in the second shaft 152 is greater than the torque in the first shaft 150. Clutch slippage may occur when the torque in the second shaft 152 is close, equal to, or oscillates between slightly lower and slightly higher than the torque in the first shaft 150. It may be desired, to avoid clutch slippage, and limit a number of occurrences of clutch engagement/disengagement, to avoid premature wear and/or increased maintenance load. More generally, such undesired clutch behaviors may cause premature wear, durability and reliability issues which may impact engine maintenance and availability in the field.

One way of avoiding some occurrences of such undesired clutch behavior will be explained in relation with the flow chart presented in FIG. 2. A first point to consider is the factors which may affect the rotation speeds of the first shaft 150 and second shaft 152. Such factors can include a plurality of controllable parameters, and may also include uncontrolled parameters. Examples of controllable parameters include fuel flow supplied to the thermal engine 118, and electrical power (e.g., amperage in a typical constant DC or AC voltage setting) supplied to the electric motor 120. In an embodiment where the load is a variable pitch propeller 116, controllable parameters may further include a pitch angle of the blades of the propeller. More specifically, increasing the fuel flow to the thermal engine 118 may increase the torque, and thus the rotation speed, of the first shaft 150. Increasing the electrical power supplied to the electric motor 120 may increase the torque, and thus rotation speed, of the second shaft 152. Decreasing the pitch angle (from coarser pitch to finer pitch) may decrease thrust and increase the rotation speed of the second shaft 152.

Examples of uncontrolled parameters may include environmental conditions such as airspeed and air pressure. Indeed, a change in airspeed (the speed of displacement of the aircraft relative the ambient air), which may occur due to wind for instance, while maintaining blade pitch constant, will affect the effective angle of attack between the propeller blades and the ambient air, which will affect thrust and torque in the second shaft 152. Variations in air pressure and air temperature may also change the way the ambient media affects the propeller and can thus have an effect on torque in the second shaft 152. The presence of uncontrolled parameters can be addressed by an open control scheme in which commands received from the pilot are translated in to values of controlled parameters configured to achieve a desired effect (e.g., increased thrust) absent uncontrolled parameters, and where the effect is then measured to detect the effect of eventual variations in uncontrolled parameters, and the values of controlled parameters can then be adjusted to compensate for the eventual variations in the uncontrolled parameters.

FIG. 2 presents a method 200 of operating a hybrid aircraft power plant 110. In this method, the hybrid aircraft power plant 110 may be operated 210 in a first mode of operation in which the thermal engine 118 is in operation and in which the clutch 136 is in an engaged configuration. Indeed, the clutch 136, when of the overrunning type, will typically be intended to be in the engaged configuration when the thermal engine 118 is in operation, except possibly in certain transient conditions, because the engagement of the overrunning clutch 136 is used in transferring power from the thermal engine 118 to the load. A plurality of the controllable parameters of the hybrid aircraft power plant 110 may then be in accordance with a first set of values, leading to operation of the hybrid aircraft power plant 110 in the first mode of operation, at a first power output.

The control scheme of the controllable parameters may include two categories of inputs: monitored inputs and commanded inputs.

The commanded inputs may include a commanded (e.g., requested) power output, such as may be received from a throttle lever for instance, or from an automated engine control system. An increase in the requested power output may be translated into an increase in fuel flow to the thermal engine and/or an increase in electrical power to the electric motor. The mapping of changes to requested power outputs to changes in fuel flow and/or electrical power can be performed in accordance with a primary control scheme, which may factor in different parameters such as amplitude of power output (higher power outputs may only be achievable by the combined operation of the thermal engine and the electric motor), state of charge of a battery (extracting power from the electric motor may be privileged over extracting thermal engine usage unless state of charge motivates otherwise), etc. Changes in throttle lever input are typically motivated by a desired for increased or decreased thrust, and the expression power output and thrust may thus be used interchangeably in this specification. Moreover, in some cases, the primary control scheme may accommodate a given requested change throttle lever position by changing the pitch of the blades without changing fuel flow nor electric motor amperage, or in combination with changing fuel flow and/or electric motor amperage. Accordingly, the method 200 may include receiving 220 a requested power output, and determining 230 a second set of values of the one or more of the controllable parameters to meet the requested power output.

Monitored inputs can be used to validate the outcome of setting the controllable parameters in a certain way, which can be desirable taking into consideration that variations in values of uncontrolled parameters may affect the response of the hybrid aircraft power plant to a given set of values of controlled parameters. Accordingly, an actual (first) power output may be determined 240 based on measuring 250 actual operating values of parameters affecting power output (i.e., monitored inputs). Accordingly, determining 230 a second set of values of the one or more of the controllable parameters to meet the requested power output may factor in the determined actual power output.

When a new value of requested power output is received, the primary control scheme may determine a second set of values for the controllable parameters. This second set of values may be determined in a manner to bring the first power output to the requested power output, and may take into consideration a determination of the first power output. The primary control scheme may factor several variables into consideration, such as the state of charge of the electrical power source of the electric motor, measured values of certain parameters concerning the aircraft and/or the environmental conditions, and the mission segment (e.g., taxiing, takeoff, landing, cruising, etc.). The primary control scheme may be performed in accordance with the prior art, and lead to a determination 230 of a first iteration of a second set of values for the plurality of controllable parameters. In the second set of values for the plurality of controllable parameters, only one, more than one, all, or any combination of the values for the plurality of controllable parameters may have changed compared to the first set.

In accordance with one approach, the values of the controllable parameters are then directly modified (set) to the second set of values, and the hybrid aircraft power plant to operates at the requested power output in the first mode of operation. In accordance with this approach, the change in the controllable parameters (as expressed in the second set of values) may lead to undesired clutch behavior.

In accordance with another approach, an analysis is performed to determine 260 whether the second set of values poses a risk of undesired clutch behavior before setting the values of the controllable parameters to the values of the second set of values. Such an analysis may include, in one example, simulating the likely outcome of operating the hybrid aircraft power plant with the second set of values, which may or may not factor in the determined actual power output. Alternately or concurrently, such an analysis may include determining whether the rotation speed and/or torque of the second shaft is close to (e.g., within a predetermined % of) the rotation speed and/or torque of the second shaft, or not.

If controlling the hybrid aircraft power plant 110 in accordance with the first iteration of the second set of values is deemed to not pose a risk of undesired clutch behavior, the process may then proceed to modify 270 the plurality of controllable parameters to the second set of values. The hybrid aircraft power plant can then continue to be operated 280 in the first mode of operation, i.e., with the thermal engine active and the clutch in the engaged configuration, but with the modified set of values for the plurality of controllable parameters.

If controlling the hybrid aircraft power plant in accordance with the first iteration of the second set of values is deemed to pose a risk of undesired clutch behavior, the process may proceed to modulate 290 the second set of values, e.g., generate a second iteration of the second set of values, in a manner to avoid the risk. The process may proceed to modify 270 the plurality of controllable parameters to the (modulated) second set of values. The hybrid aircraft power plant can then continue to be operated 280 in the first mode of operation, i.e., with the thermal engine active and the clutch in the engaged configuration, but with the (modulated) second set of values for the plurality of controllable parameters. Modulating 290 the second set of values may involve increasing the value of the fuel flow to the thermal engine, reducing the value of the electrical power to the electric motor and/or adjusting (typically decreasing/making finer) the value of the pitch of the propeller blades. Optionally (as represented by a dashed line), this second iteration of the second set of values may also be analyzed to determine whether it poses a risk of undesired clutch behavior for one or more additional iteration, until a second set of values deemed to not pose a risk of undesired clutch behavior is reached, or until certain other conditions are met (e.g., number of iteration or elapsed time).

Performing the analysis to determine whether the second set of values poses a risk of undesired clutch behavior may be contingent upon making a determination that engagement of the clutch is desired, which can include determining whether the intended mode of operation of the hybrid aircraft power plant corresponds to a scenario where clutch engagement is desired. For instance, if the aircraft is taxiing in an electric mode of operation, a mode where the thermal engine is deactivated and clutch engagement is not desired, the analysis to determine whether the second set of values poses a risk of undesired clutch behavior may be deactivated until the hybrid aircraft power plant returns to a mode of operation where the clutch engagement is desired. In one embodiment, the analysis may be performed only when the thermal engine is active.

In one embodiment, a process such as presented in FIG. 2 may be used to avoid dwelling in conditions in which a slippage risk is present, while switching from a mode where clutch engagement is desired to a mode where clutch engagement is not desired, or vice-versa. For instance, if the primary control scheme determines a second set of values of the one or more of the controllable parameters which corresponds to a transition phase between a mode where clutch engagement was desired and a mode where clutch engagement is no longer desired, the conclusion that a risk of undesired clutch behavior is present may trigger a modulation of the second set of values having the effect of limiting the dwelling time in such conditions. For instance, if the hybrid aircraft power plant 110 is transitioning to a mode in which the thermal engine 118 is to be deactivated, the modulation may have the effect of increasing electrical power to the electric motor 120 at a greater rate than it would have in the absence of the modulation, thereby performing a more pronounced and clear clutch disengagement than if the electrical power to the electric motor would have increased more progressively.

FIG. 3 presents a diagram of an embodiment of a hybrid aircraft power plant 110. The hybrid aircraft power plant 110 can be seen to further have computer 132 (which may alternately be referred to herein as a power plant electronic control system), a fuel tank 126, a fuel management unit 142, an electrical power source 130 (e.g., a battery), an electric motor controller 158 (which may further provide an inverter function), a throttle lever 166, and a plurality of sensors including a blade pitch sensor 156, a current sensor 160, a motor shaft sensor 162 (e.g., speed/position sensor) and an engine shaft sensor 164. The clutch 136 can be an overrunning clutch.

During operation of the hybrid aircraft power plant 110 in which clutch engagement is intended, and when the clutch 136 is of the overrunning clutch type, the computer can perform a method 300 such as shown in FIG. 4 to avoid clutch slippage. In this embodiment, the computer determines 320 the actual (first) power/thrust output based on measuring 310 the current value of several parameters representing inputs, such as: propeller blade pitch angle, propeller speed, thermal engine shaft speed, thermal engine shaft torque, electric motor amperage and electric motor shaft rotation speed. Values of environmental/uncontrolled parameters such as temperature and pressure of air at the inlet of the thermal engine 118 may also be measured. The propeller blade pitch angle and the propeller speed may be measured using a sensor 156 commonly referred to as a measurement system or beta sensor. The thermal engine shaft speed and the thermal engine shaft torque may be measured using a sensor 164 commonly referred to as a torque measuring system 164 (TQMS). The electric motor amperage can be measured using a current sensor 160. The electric motor shaft rotation speed may be measured using an electric motor shaft sensor 162. Ambient air pressure and air inlet temperature may be measured by associated sensors 170. The state of charge of the electrical power source (e.g., battery 130) may also be measured and communicated to computer 132.

The computer 132 may control the values of specific outputs, namely fuel flow, electric motor amperage and propeller control unit actuator position (the latter affecting blade pitch).

Referring to FIG. 4, a requested power may be determined 330 based on an input 340 received from the throttle lever. A variation between the actual power and the requested power may then be determined 350. A determination 360 may then be made, based on measured system parameters (propeller speed, thermal engine speed) whether the variation value in power may cause a risk of slippage or disengagement of the overrunning clutch when the thermal engine is running. Clutch engagement conditions can be when the input shaft of the clutch has a rotation speed/torque above the rotation speed/torque of the output shaft of the clutch. Clutch disengagement conditions can be when the input shaft of the clutch has a rotation speed/torque below the rotation speed/torque of the output shaft of the clutch. Clutch slippage may represent engagement/non-engagement cyclic swap in the condition of the overrunning clutch, and may occur when the rotation speed/torque of the input shaft is very close to the rotation speed/torque of the output shaft and/or oscillates between slightly below and slightly above. If the variation value does not cause a risk of slippage or undesired disengagement of the overrunning clutch, the power control parameters (outputs) can be controlled 380 accordingly to match the pilot power or thrust demand. If the variation value causes a risk of slippage or disengagement of the overrunning clutch, the power control parameters (outputs) can be modulated (corrected) 370 to avoid the risk of slippage or disengagement while also meeting the variation value in power. The modulation may involve reducing electric motor power, increasing thermal engine power and/or adjusting blade pitch. The modulation may involve making a more transitional change (i.e., spanning a greater period of time) between the actual power/thrust output and the commanded power/thrust output. The modulation may have the effect of controlling the power turbine speed just slightly higher than the propeller speed, which can maintain the clutch engaged.

In embodiments where gearing (e.g., 138, 140) is used between the thermal engine 118 and the clutch 136 and/or between the clutch 136 and the propeller 116, the rotation speed of the first shaft 150 and/or second shaft 152 can be directly proportional to the rotation speed of the thermal engine shaft and/or propeller shaft by a factor corresponding to the gearing ratio.

Many turboprop engines, and some turbofan engines, have variable pitch systems. Referring to FIG. 5A, the principle of a variable pitch system will be explained here in relation with a turboprop engine example, with the understanding that this explanation can be transposed to fan blades of turbofan engines. Turboprop engines have a rotary thrust device in the form of a propeller 70 which include a plurality of blades 72 whereas in turbofans, the thrust device in is the form of a fan having a plurality of blades (not shown). The blades 72 each have a length extending radially away from a propeller rotation axis 74 (which can coincide or be offset from the main axis 11 depending on the embodiment), and the blades 72 are circumferentially distributed (interspaced from one another) around a hub 76 centered on the rotation axis 74. The blades 72 are collectively rotatable when the propeller 70 rotates, in a plane of rotation 78. Each blade extends roughly radially from the hub 76 from a stem to a tip. In addition to being collectively rotatable around the rotation axis 74, each blade 72 is individually rotatable around a pitch axis 60 extending along its length so as to allow controlling its pitch. Typically, the pitch of all blades 72 of a given propeller 70 is changed simultaneously.

During flight, airspeed can vary and the rotation speed of the propeller 70 can also vary, leading to changes in the incidence angle locally perceived by each blade taking into consideration its tangential velocity. Changing the pitch can change this incidence angle, which can produce more or less thrust, and lead to a change in air speed, and thus incidence angle. Changing the rotation speed can also be affected by the amount or power (e.g. fuel flow rate into the engine in the case of a pure heat engine) for example. The incidence angle and the rotation speed, in turn, affect the airspeed, forming a relatively complex relationship between many measurable variable parameters. Some variable pitch systems are manually controlled, whereas others are controlled by a computer (e.g. engine controller) or mechanically controlled. In some embodiments where variable pitch systems are controlled by an engine controller, the software functions associated to blade control can be grouped and said to form part of a propeller control unit 148. Such a propeller control unit 148 can have a function to control the pitch of the blades, and can also have a function to control a rotation speed of the blades (around the rotation axis) in some embodiments.

As graphically represented in FIG. 5A, pitch angles in which the chord of the blades are closer to alignment with the rotation axis 74 are referred to as "coarser" 82 by convention and corresponding to a greater pitch angle $\alpha$, whereas pitch angles in which the chord of the blades are closer to alignment with the plane of rotation 78 of the blades are referred to as "finer" 84 and corresponding to a smaller pitch angle $\alpha$.

In practice, in many embodiments, blades 72 are designed with a twist along their length to account for the fact that the tangential velocity at the tip of the blades 72 is greater than the tangential velocity at the root, at a given angular speed, due to the difference in circumference. The different tangential velocities can lead to differences in locally perceived angles of attack which the twist can aim to minimize. In such cases, the angle of the chord relative to the pitch axis is not constant along the length of the blade 72 and the expression "pitch angle" can therefore refer to an average chord angle taking into consideration the entire length of the blade 72.

Increasing the pitch angle $\alpha$ typically increases thrust whereas reducing the pitch angle $\alpha$ typically decreases torque, in typical conditions of operation such as takeoff, climbing, flight and descent, and when the pitch angle is generally oriented in a manner to generate thrust (some pitch angles, such as feathering or disking, are not intended to generate thrust, and reverse thrust may also be achievable in some variable pitch propellers via negative pitch angles). When the pilot requests increased thrust via actuation of the throttle lever, the computer may translate this request into an increase in fuel flow, an increase in amperage to the electric motor, and/or an increase in the pitch angle $\alpha$ in accordance with the primary control scheme, and if the values determined by the primary control scheme are considered to entrain a risk of clutch disengagement or slippage, the values can be modulated to avoid this risk, such as by increasing fuel flow, reducing amperage and/or reducing pitch angle compared to the first iteration.

Figure 5B:
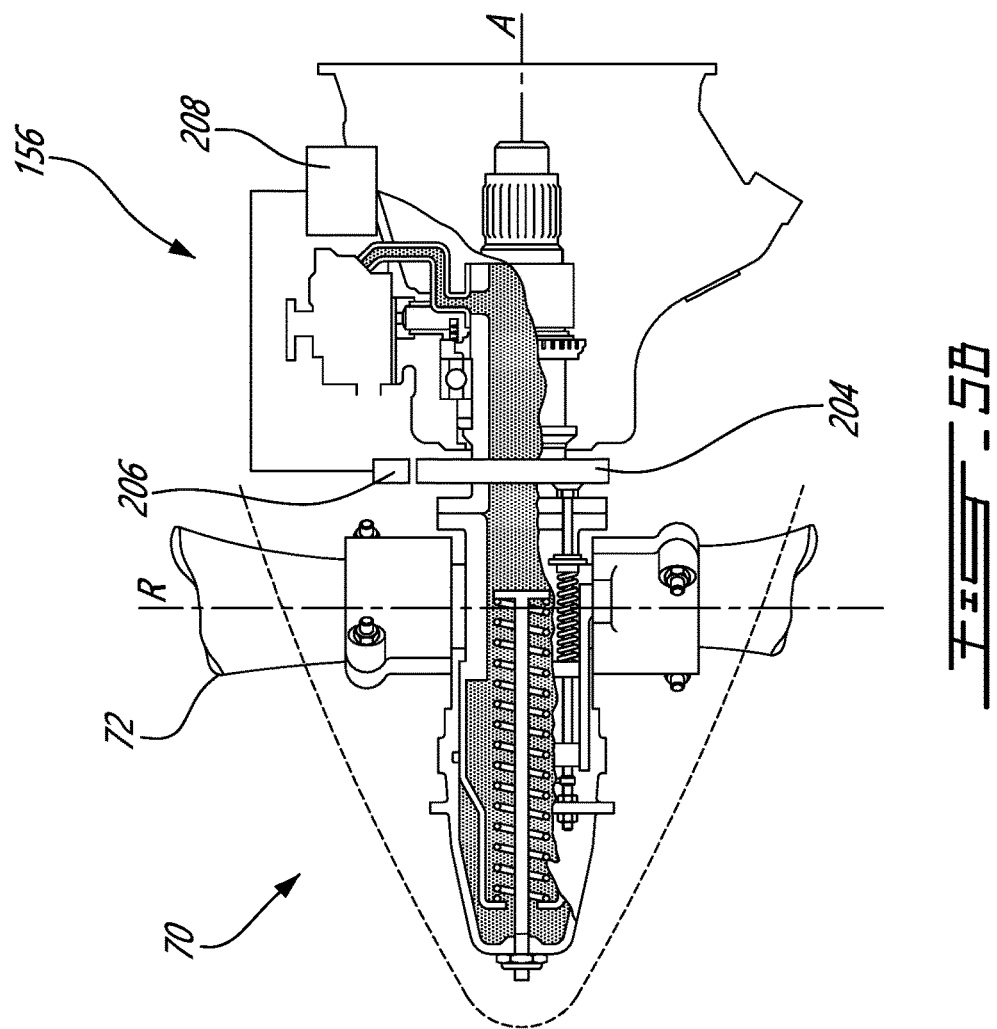
FIG. 5B is a side elevation view showing a blade pitch control and measurement system.
Figure 5A:
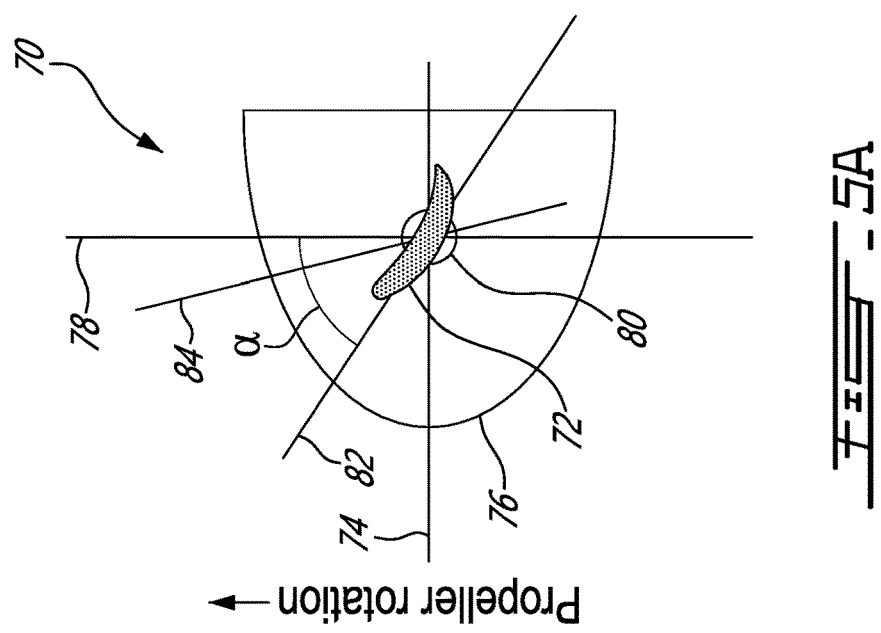
FIG. 5A is a side elevation view schematizing blade pitch.

FIG. 5B presents an example of a measurement system 156 which provides blade pitch (or beta) angle position feedback during rotation of the propeller 70, and may additional provide a measurement of the rotation speed of the propeller, from which output shaft speed of the clutch may be calculated based on the known gear ratio. Generally, the measurement system 156 includes a feedback device in the form of a ring 204 having a plurality of position markers that rotate with the ring 204 about axis A. The measurement system 156 also includes a pitch sensor 206 designed to detect the position markers of the ring. During operation of the propeller 70, the sensor 206 can be held on the engine casing, and the propeller 70 and the ring 204 can thus rotate relative to the sensor 206.

Various different embodiments are possible. Indeed, the configuration presented in FIG. 1 is an example of a parallel drivetrain configuration in which the thermal engine shaft 122 is coaxial with the output shaft 112 and the reduction gearing 140 is epicyclic gearing. The clutch 136 is disposed coaxially to the thermal engine 118. The rotor shaft 124, while parallel to the output shaft 112, is offset from the output shaft 112, and the gearing 138 can be referred to as a parallel geartrain. In this embodiment, the rotor shaft 124 is not coaxial to the output shaft 112, but offset from axis 114. The rotor shaft 124 is connected to the output shaft 112 via a geartrain 138 which may or may not include reduction. Such a parallel drivetrain configuration may be useful in some embodiments to avoid significant increase in the axial length of the power plant by the introduction of electric motor 120 compared to the case where the electric motor 120 is absent and the only source of power is the thermal engine 118, for instance.

In the embodiment presented in FIG. 1, the electric motor 120 is directly coupled to the parallel geartrain. In other words, there is no clutch between the electric motor 120 and the output shaft 112. A safety disengagement feature may nonetheless be integrated to the electric motor 120 itself whereby the electric motor 120 may disengage from the parallel geartrain in the event of surcharge, overtorque, bearing seizure, etc., in which case the load may continue to be driven by the thermal engine 118. it will be noted in the embodiment presented in FIG. 1 that an intermediary shaft connects the rotor shaft 124 to the output shaft 112, and that the intermediary shaft is transversal to the parallel axes of the rotor shaft 124 and of the output shaft 112. Here, the second lubricant pump 144 is shown coupled to the rotor shaft 124 though it will be understood that in an alternate embodiment the second lubricant pump 144 may be coupled to the intermediary shaft for instance.

Figure 6:
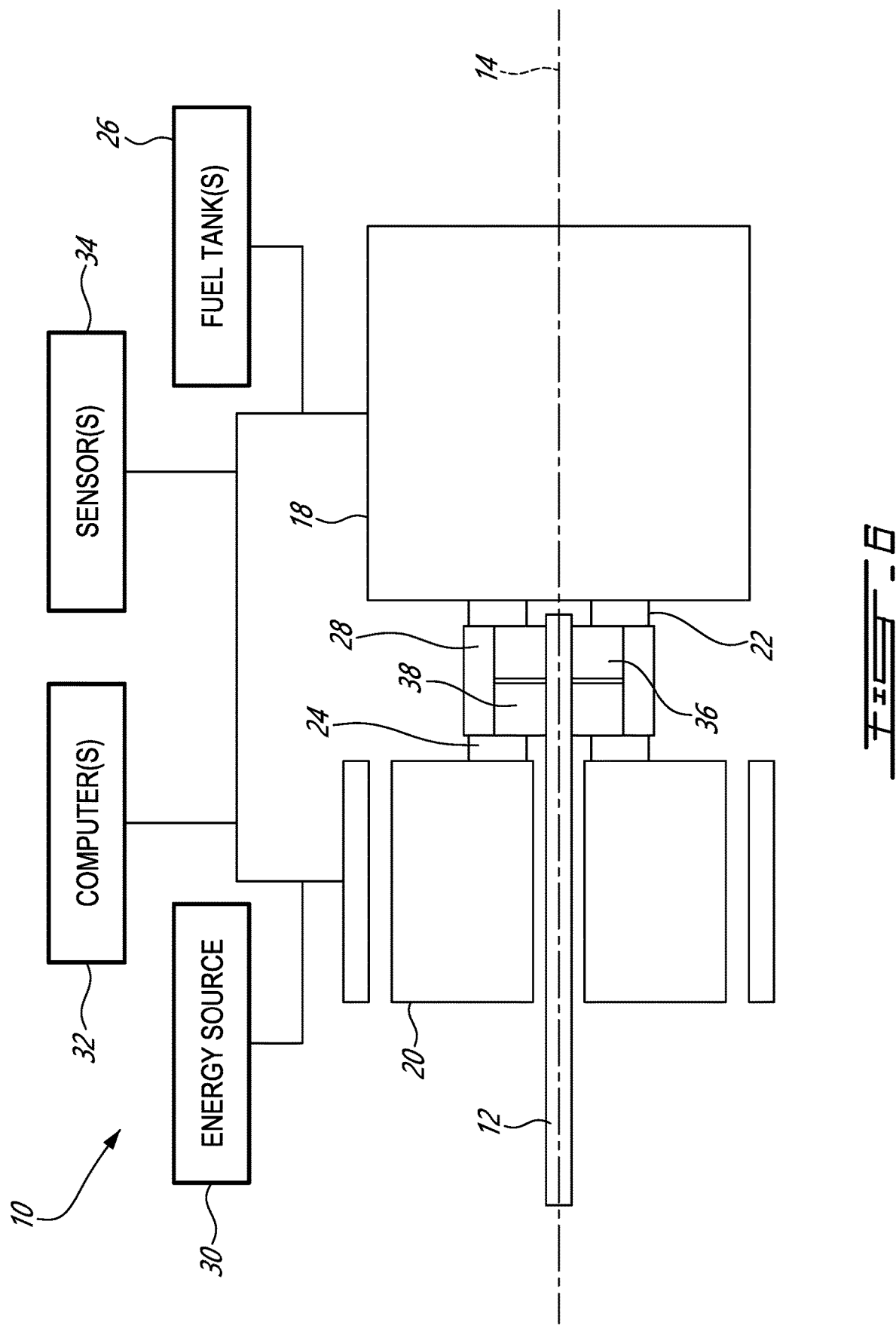
FIG. 6 is a schematic cross-sectional view of an other example of a hybrid aircraft power plant.

FIG. 6 is a schematic illustration of an other exemplary configuration of a power plant 10 which can be said to be of an in-line gearing configuration. The power plant 10 is drivingly connectable to a load (not shown) via an output shaft 12. The output shaft 12 rotates about an axis 14. Power plant 10 may include one or more thermal engines 18 (referred hereinafter in the singular) and one or more electric motors 20 (referred hereinafter in the singular). In an embodiment of power plant 10, thermal engine 18 and electric motor 20 may be arranged in parallel and each be selectively operable to drive the propeller 16 or not independently from the other. More specifically, in the example presented in FIG. 1, the thermal engine 18 has a thermal engine shaft 22, and the electric motor 20 has a rotor shaft 24. A first clutch 36 is operable to engage (or disengage) the thermal engine shaft 22 with (or from) the output shaft 12, and a second clutch 38 is operable to engage (or disengage) the rotor shaft 24 with (or from) the output shaft 12. The second clutch 38 can operate independently of the first clutch 36. A third clutch 28 can be used to selectively engage (or disengage) the rotor shaft 24 to (or from) the thermal engine shaft 22.

It will be noted in this embodiment that the thermal engine shaft 22 is coaxial with the output shaft 12 and with the rotor shaft 24. The first clutch 36 and the second clutch 38 are disposed axially between the electric motor 20 and the thermal engine 18, relative the axis. In this exemplary configuration, the electric motor 20 surrounds the output shaft 12 and axially overlaps with the output shaft 12. The output shaft 12 has two opposite ends which axially protrude from the electric motor 20 including a first end connected to the propeller 16 and a second end connected to the first clutch 36 and second clutch 38. The first end and the second end are on opposite sides of the electric motor 20 along the axis 14.

The electric motor 20 can be used as a starter when the thermal engine 18 is stopped. In this embodiment, the output shaft 12 extends axially across the electric motor 20. This configuration can be beneficial in exposing the electric motor 20 at the front of the aircraft, to the airflow generated at the propeller or other air mover, which may be useful in cooling the electric motor 20 during operation, for instance.

An embodiment such as presented in FIG. 6 can be referred to as an in-line gearing configuration. The in-line gearing configuration may alloy a more compact and minimum frontal area beneficial for aero engine. For failure scenarios, sprag clutches can allow to decouple the thermal engine or electric motor when stopped allowing the other engine to continue.

Thermal engine 18 may include a (e.g., continuous or intermittent) internal combustion engine. In various embodiments, thermal engine 18 may include a gas turbine engine, a rotary (e.g., Wankel) engine or a piston engine for example. Thermal engine 18 may generate first torque at thermal engine shaft 22 from the controlled combustion of a suitable fuel stored in fuel tank 26 and supplied to thermal engine 18.

In various embodiments, electric motor 20 may be a permanent magnet synchronous motor, a brushless direct-current (DC) electric motor, or an alternating-current (AC) motor for example. Electric motor 20 may generate torque at the rotor shaft 24 via the conversion of electric energy received from energy source 30. Energy source 30 may be a direct current (DC) electric source used to drive motor 20 via suitable power electronics (e.g., inverter) and motor controller. Energy source 30 may alternately or additionally have an alternating current (AC) electric source. Energy source 30 may include one or more batteries (e.g., battery bank) or supercapacitors for example. Energy source 30 may include one or more lithium-ion batteries, one or more nickel-metal hydride batteries and/or one or more lead-acid batteries to name some potential examples.

In some embodiments, energy source 30 may be rechargeable or otherwise have one or more rechargeable elements. For example, the operation of electric motor 20 as an electric generator may be used to recharge energy source 30 in some situations. In some embodiments, electric motor 20 may be used as a starter for the thermal engine 18.

In some embodiments, power plant 10 may be operated to manage the state-of-charge (SOC) of energy source 30 by the selective operation of electric motor 20 as a motor to draw energy from energy source 30 or as a generator to input energy into energy source 30. Alternatively or in addition, energy source 30 may be recharged using a ground-based source of electric power when aircraft is on ground, such as an AC power supply.

In various embodiments, thermal engine 18 and electric motor 20 may be controlled by one or more controllers implemented by one or more computer(s) 32 (referred hereinafter in the singular). In some embodiments, thermal engine 18 and electric motor 20 may be operated either together or separately to drive the propeller 16. In some embodiments, the operation of thermal engine 18 and/or electric motor 20 may be selected based on a phase of flight of aircraft and/or based on an action (e.g., maneuver) to be executed by aircraft. For example, in a phase of flight having a high power requirement, such as during a takeoff phase or a climb phase maneuver of aircraft, both thermal engine 18 and electric motor 20 may be used to cooperatively drive the propeller 16. In a leveled cruise phase of flight, only thermal engine 18 may be used to drive the propeller 16. For example, during taxiing, i.e., the moving of the aircraft on the ground, at the airport, only electric motor 20 may be used to drive the propeller 16.

Computer 32 may be operatively connected to control the operation of thermal engine 18 and output power from thermal engine 18 in part by controlling a fuel flow from fuel tank 26 to thermal engine 18 via a suitable fuel metering unit for example. Computer 32 may be operatively connected to control the operation of motor 20 and output power from thermal engine 18 in part by controlling a delivery of electric current from energy source 30 to thermal engine 18 via suitable power electronics for example.

Power plant 10 may include one or more sensors 34 operatively connected to energy source 30, electric motor 20, thermal engine 18, fuel tank 26, and/or to computer 32. In some embodiments, computer 32 may receive signals indicative of one or more parameters of energy source 30, electric motor 20, thermal engine 18 and/or fuel tank 26, via sensor(s) 34. The signals may be used by computer 32 to control the operation of electric motor 20, thermal engine 18, and/or assess a state of energy source 30, to name some examples. For example, sensor(s) 34 may include one or more voltage sensors, one or more current sensors, one or more torque sensor, one or more rotation speed sensor, and/or one or more temperature sensors.

Computer 32 may also receive inputs from the flight crew commanding the operation of power plant 10. Such inputs may be received from input devices actuatable by the flight crew and may include one or more buttons, switches and/or levers for example. In some embodiments, such input devices may include a throttle input device such as a throttle lever, which may also be referred to as a thrust lever or a power lever depending on the configuration of power plant 10. Throttle lever may be pivotable by the flight crew so that a throttle lever angle (TLA) may be indicative of a desired output power to be generated by power plant 10 and propeller 16. Computer 32 may control the thermal engine 18 and/or the motor 20 according to the TLA, and based on values measured via the sensors 34, so that a desired amount of thrust may be produced via the propeller 16.

In the exemplary embodiment presented in FIG. 6, the first clutch 36 directly connects the thermal engine shaft 22 to the output shaft 12, and the second clutch 38 directly connects the rotor shaft 24 to the output shaft. In an alternate embodiment, a reduction gearing may be present between the thermal engine shaft 22 and the first clutch 36, between the rotor shaft 24 and the second clutch 38, or both.

The third clutch 28 may be an active clutch such as a friction clutch or a dog clutch. An active clutch may allow selective control over the engagement and disengagement, via a controller which may include a computer 32, either based on user input and/or a control scheme which may be in the form of computer readable instructions stored in a non-transitory memory of computer 32.

The clutch 136, the first clutch 36, and the second clutch 38 may be passive, one-way, clutches, i.e., overrunning (freewheel) clutches which disengage automatically when the output shaft 12, 112 rotates faster than the respective one of the thermal engine shaft 22, 122 and the rotor shaft 24, 124. One potential advantage of overrunning clutches it that they do not need to be actively controlled, and therefore may avoid the necessity of using certain sensors, actuators, and/or control schemes. Overrunning clutches may also be mechanically simpler, more reliable, and/or have lower weight and volume than other types of clutches. There are different types of overrunning clutches, including sprag clutches, roller ramp clutches, wrap spring clutches, and wedge styles clutches. In an embodiment, the clutch 136, the first clutch 36, and the second clutch 38 can be sprag clutches. Sprag clutches may offer the feature of being relatively robust, reliable and compact. In the event of sudden stoppage of the electric motor and/or of the thermal engine, the corresponding sprag clutch will disengage automatically. The electric motor 20 or the thermal engine 18, 118 may also automatically disengage when they generate less rotation speed than the other. In some cases, this automatic disengagement feature may be desired, whereas in others, it may not be desired. The third clutch 28 may be provided to avoid the individual automatic disengagement feature of either one of the electric motor 20 and thermal engine 18 in situations where it is not desired to disengage the electric motor 20 from the thermal engine 18. The third clutch 28 is optional. Power plant 10 may be connected to an air mover, or to another form of load. In one embodiment, power plant 10 may be an auxiliary power unit, for instance.

In some embodiments, it may be suitable to design the power plant for the electric motor to rotate at relatively high rotation speeds, since in some cases, for a same volume and weight of electric motor, a greater power may be achieved by the electric motor if it rotates at higher speeds, potentially achieving greater power density. This may particularly be beneficial in aircraft applications. By using two different reduction gearboxes, the rotation speed of the electric motor may be optimized independently of the optimization of the rotation speed of the thermal engine. Accordingly, in some embodiments, an epicyclic gearing may, for instance, be present between the thermal engine 18 and the first clutch 36, between the electric motor 20 and the second clutch 38, or both.

It will be understood that in an alternate embodiment, a method such as presented above in association with FIG. 2 may be used to address a risk of undesired clutch behavior concerning a clutch of the overrunning clutch type coupling the electric motor to the load, such as second clutch 38, alternately, or in addition to, addressing a risk of undesired clutch behavior concerning a clutch coupling the thermal engine and the load, such as first clutch 36.

The computer(s) 32, 132 or computing devices of the controller may be the same or different types of devices. Note that the controller can be implemented as part of a full-authority digital engine controls (FADEC) or other similar device, including electronic engine control (EEC), engine control unit (ECU), electronic propeller control, propeller control unit, and the like. In some embodiments, the controller is implemented as a Flight Data Acquisition Storage and Transmission system, such as a FAST™ system. The controller may be implemented in part in the FAST™ system and in part in the EEC. Other embodiments may also apply.

The computer(s) 32, 132 comprises a processing unit 412 and a memory 414 which has stored therein computer-executable instructions 416. The processing unit 412 may comprise any suitable devices configured to implement a method such that instructions, when executed by the computer(s) or other programmable apparatus, may cause the functions/acts/steps performed to control the mode of operation of the engine to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

The methods and systems for controlling the engine described herein may be implemented in a high level procedural or object oriented programming or scripting language, or a combination thereof, to communicate with or assist in the operation of a computer system, for example the computer(s). Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit of the computing device, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

While the description may present method and/or process steps as a particular sequence, it is understood that to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. As used herein, the term "about" is intended to allow for a 10% variation of the associated numerical values.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Other applications would be recognized by the person of ordinary skill in the art and are considered to be within the scope of the present disclosure. Yet further modifications could be implemented by a person of ordinary skill in the art in view of the present disclosure, which modifications would be within the scope of the present technology.

The invention claimed is:

1. A method of operating a hybrid aircraft power plant having a propeller, a propeller control unit operable to change a pitch of blades of the propeller, an electric motor coupled to the propeller, a thermal engine, a first shaft coupling the thermal engine to an overrunning clutch, and a second shaft coupling the overrunning clutch to the propeller, the method comprising:

operating the hybrid aircraft power plant in a first mode of operation in which i) the overrunning clutch is in an engaged configuration,
ii) the thermal engine is in operation, and
iii) a plurality of controllable parameters including the pitch of the blades, a fuel flow to the thermal engine, and an electric power to the electric motor, have a first set of values associated to a first power output;

receiving a requested power output;

determining a second set of values of the one or more of the controllable parameters to meet the requested power output;

determining whether said second set of values poses a risk of undesired clutch behavior;

when the second set of values does not pose the risk, setting the plurality of controllable parameters to the second set of values; and when the second set of values poses the risk, modulating the second set of values to avoid the risk and setting the plurality of controllable parameters to the modulated second set of values.

2. The method of claim 1 wherein said determining whether said second set of values poses the risk includes determining whether a rotation speed of the second shaft may exceed a rotation speed of the first shaft.

3. The method of claim 2 wherein said determining whether the rotation speed of the second shaft may exceed the rotation speed of the first shaft includes determining whether a torque of the second shaft is within a predetermined percentage of a torque of the first shaft.

4. The method of claim 1 wherein said modulating the second set of values includes at least one of increasing the fuel flow to the thermal engine, decreasing the electric power to the electric motor, and decreasing the pitch of the blades, and wherein subsequently to said setting the plurality of controllable parameters, said plurality of controllable parameters have the second set of values and the hybrid aircraft power plant operates at the requested power output in the first mode of operation.

5. The method of claim 1 wherein said modulating the second set of values includes increasing the fuel flow to the thermal engine.

6. The method of claim 1 wherein said modulating the second set of values includes decreasing the electric power to the electric motor.

7. The method of claim 1 wherein said modulating the second set of values includes decreasing the pitch of the blades.

8. The method of claim 1 further comprising determining the first power output, wherein said determining a second set of values includes changing at least one value of the first set of values to a corresponding at least one value of the second set of values based on a difference between the first power output and the requested power output.

9. The method of claim 8 wherein said determining the first power output includes measuring operation parameters of the hybrid aircraft power plant and calculating the first power output based the measured operation parameters.

10. The method of claim 1 wherein said undesired clutch behavior is clutch disengagement.

11. The method of claim 1 wherein said undesired clutch behavior is clutch slippage.

12. The method of claim 1 wherein said modulating the second set of values includes delaying a transition of at least one value from the first set of values to the corresponding at least one value of second set.

13. The method of claim 1 wherein said determining a second set of values is based on a value of a state of charge of a battery, the battery connected to the electric motor.

14. A system for controlling the operation of a hybrid aircraft power plant having a propeller, a propeller control unit operable to change a pitch of blades of the propeller, an electric motor coupled to the propeller, a thermal engine, a first shaft coupling the thermal engine to an overrunning clutch, and a second shaft coupling the overrunning clutch to the propeller, the system comprising:

a controller having a processor and non-transitory memory storing instructions, which instructions when executed by the processor cause the controller to:

operate the hybrid aircraft power plant in a first mode of operation in which
i) the overrunning clutch is in an engaged configuration,
ii) the thermal engine is in operation, and
iii) a plurality of controllable parameters including the pitch of the blades, a fuel flow to the thermal engine, and an electric power to the electric motor, have a first set of values associated to a first power output;

receive a requested power output;

determine a second set of values of the one or more of the controllable parameters to meet the requested power output;

determine whether said second set of values poses a risk of undesired clutch behavior;

when the second set of values does not pose the risk, set the plurality of controllable parameters to the second set of values; and when the second set of values poses the risk, modulate the second set of values to avoid the risk and set the plurality of controllable parameters to the modulated second set of values.

15. A method of operating a hybrid aircraft engine having an electric motor coupled to a load, a thermal engine coupled to a load, an overrunning clutch coupled to one of the thermal engine and electric motor via a first shaft, the overrunning clutch coupled to the load via a second shaft, the method comprising:

operating the hybrid aircraft engine in a first mode of operation in which a plurality of controllable parameters including a fuel flow to the thermal engine and an electric power to the electric motor has a first set of values corresponding to a first power output;

receiving a requested power output;

determining a second set of values of the one or more of the controllable parameters to meet the requested power output;

determining whether said second set of values poses a risk of undesired clutch behavior;

when the second set of values does not pose the risk, setting the plurality of controllable parameters to the second set of values; and when the second set of values poses the risk, modulating the second set of values to avoid the risk and setting the plurality of controllable parameters to the modulated second set of values.

16. The method of claim 15 wherein said determining whether said second set of values poses the risk includes determining whether a rotation speed of the second shaft may exceed a rotation speed of the first shaft.

17. The method of claim 15 wherein said modulating the second set of values includes at least one of increasing the fuel flow to the thermal engine and decreasing the electric power to the electric motor, and wherein subsequently to said setting the plurality of controllable parameters, the plurality of controllable parameters have the second set of values and the hybrid aircraft engine to operates at the requested power output in the first mode of operation.

18. The method of claim 15 further comprising determining a first power output, wherein said determining a second set of values includes changing at least one value of the first set of values to a corresponding value of the second set of values based on a difference between the first power output and the requested power output.

19. The method of claim 18 wherein said determining a first power output includes measuring operation parameters of the hybrid aircraft power plant and calculating the first power output based the measured operation parameters.

20. The method of claim 15 wherein said undesired clutch behavior is clutch slippage.

\* \* \* \* \*